CIRCUIT, INCLUDING NEGATIVE RESISTANCE DEVICE

Filed July 21, 1949

INVENTOR
John W. Harling
BY R. F. Morris
ATTORNEY

Patented Aug. 28, 1951

2,565,497

UNITED STATES PATENT OFFICE 2,565,497

CIRCUIT, INCLUDING NEGATIVE RESISTANCE DEVICE

John West Harling, London, England, assignor to International Standard Electric Corporation, New York, N. Y., a corporation of Delaware Application July 21, 1949, Serial No. 106,027
In Great Britain July 23, 1948

7 Claims. (Cl. 171—97)

The present invention relates to an electric trigger circuit arrangement employing a rectifier of the point contact type that exhibits negative resistance characteristics, such as germanium, silicon, lead sulphide or like crystal rectifiers.

The circuit is intended primarily for the amplification of electric pulses.

The invention in its broadest aspect provides an electric trigger circuit comprising a crystal rectifier of the kind having a current voltage characteristic curve including a branch with two adjoining portions with positive and negative slopes, respectively, means for biassing the rectifier through a load resistance to operate at a point on one of the said portions of the branch, means for applying a signal voltage to the rectifier in such manner as to transfer the operating point over to the other portion of the branch, and an output circuit connected across the rectifier.

According to other features of the invention, the trigger circuit may be adapted as a pulse amplifier in particular it may be employed as a pulse repeater on a communication circuit.

As will be explained in detail later, the characteristic curve relating the current through a germanium crystal rectifier to the applied voltage has a portion over which as the current increases the applied voltage decreases, so that the slope resistance of the rectifier is negative. The crystal may therefore be used as an amplifier over this portion of the characteristic.

In one example, the present invention employs a germanium crystal rectifier in a trigger circuit which can be used to amplify electric pulses. In this circuit, one terminal of the rectifier is connected to ground or other point of fixed potential, and a pulse to be amplified is applied in positive sense from a low impedance source through a condenser to the other terminal. This last mentioned terminal is also connected through a load resistance to a source of positive bias potential which thus biases the crystal in the reverse or high resistance direction.

Now it is found that if the current passing through the rectifier is measured for increasing values of the potential across the rectifier, this current is at first relatively small and increases slowly in accordance with the high reverse resistance of the crystal. However, a critical point is presently reached at which the current suddenly increases rapidly and at the same time the potential across the rectifier falls, and the rectifier would be destroyed in the absence of a suitable load resistance. This is the negative resistance portion of the characteristic of the rectifier. In order to take advantage of this phenomenon according to the invention, the potential of the bias source is adjusted so that in the absence of an input pulse, the critical point referred to above is nearly but not quite reached. The slope resistance of the rectifier is then still positive, and the circuit is stable. The amplitude of the input pulse is adjusted so that it raises the potential applied to the load resistance terminal of the rectifier above the critical value, and so tips it over into the negative resistance region. A sudden increase of current through the load resistance is produced, and so an amplified pulse may be obtained in an output circuit connected across the rectifier.

By suitable design of the circuit, when the negative trailing edge of the input pulse occurs, the rectifier can be made to return automatically to the high resistance condition corresponding to the bias potential, and is then ready to amplify the next pulse.

It should be noted that the references given above to the voltage applied to the crystal and current through the crystal refer to the voltage applied to, and current between the electrodes, one electrode being the usual metal base electrode and the other electrode being a point contact, usually of the "cats whisker" type, applied to the crystal at the opposite end thereof to the base electrode. The magnitude of the bias voltage referred to varies to some extent with the individual crystal but in particular cases using a germanium crystal has been found to be about 50 volts.

As stated above, the invention is not restricted to the use of germanium rectifiers, but can be employed with other rectifiers of the type stated such as silicon and lead sulphide rectifiers. We have obtained the best results with germanium crystals that have been given suitable treatment to increase their rectifying properties.

It is to be noted that during the period of the pulse, a heavy current passes through the crystal which heats the crystal. The effect of this heating is largely cumulative in successive pulses and it is therefore advisable that some cooling means be provided such as mounting the rectifier in a metal casing which may be constructed with heat dissipating means.

The invention will be described in greater detail with reference to the accompanying drawing, in which—

Figure 1:
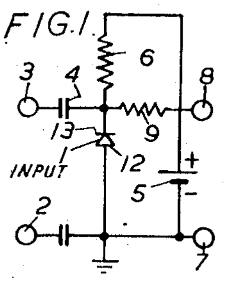
Fig. 1 shows a schematic circuit diagram of a trigger circuit according to the invention.

Fig. 1 shows a simple form of a trigger or pulse amplifier circuit according to the invention. A germanium crystal rectifier 1 has one terminal connected to an input terminal 2, which may be connected to ground as shown and the other terminal connected to a second input terminal 3 through a blocking condenser 4. A polarising source 5 of suitable potential, and indicated conventionally as a battery, is connected across the rectifier 1 through a load resistance 6. Two output terminals 7 and 8 are provided, terminal 7 being connected to one terminal of the rectifier 1 and terminal 8 to the other terminal through a resistance 9.

Figures 2, 3, 6:
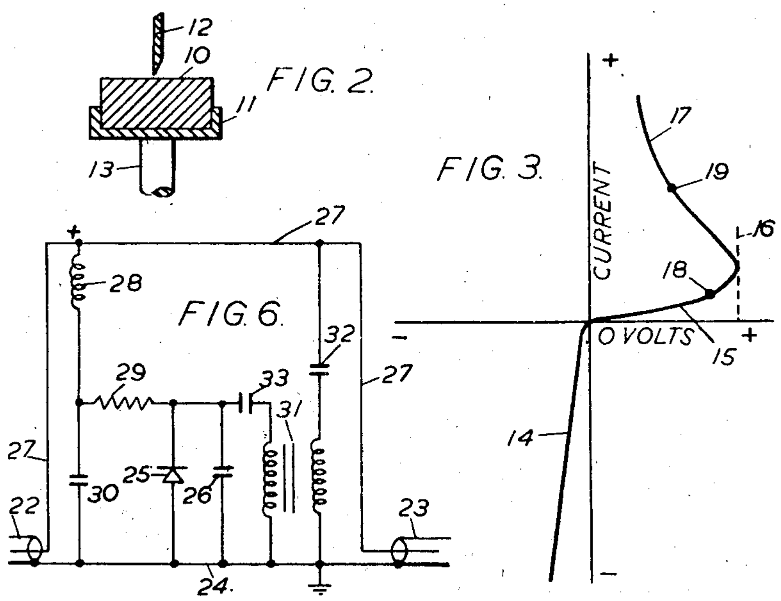
Fig. 2 shows a sectional view of the rectifier used in the circuit of Fig. 1.
Fig. 3 shows a characteristic curve of the rectifier.
Figs. 6 and 7 show schematic circuit diagrams of pulse repeaters employing trigger circuits according to the invention.

One possible form of the crystal rectifier 1 is shown in section in Fig. 2. It comprises a disc 10 of germanium held in a metal cup or base 11 to which it is soldered or otherwise securely fixed, and a fine wire electrode or catswhisker 12 having a sharp pointed end held in contact with the surface of the disc by means not shown. The base may have a shank 13 which can be used as a terminal.

In Fig. 1 the rectifier is shown with the catswhisker terminal 12 connected to ground and the base terminal 13 connected to the input terminal 3 through the condenser 4. In this case the source 5 should have the negative terminal connected to ground so that the rectifier is biassed to the high resistance condition.

Fig. 3 shows the characteristic curve of a germanium rectifier of this kind. The abscissae represent the voltages between the base terminal 13 and the catswhisker electrode 12, and the ordinates represent the corresponding current flowing through the resistance 6 (Fig. 1).

The portion 14 of the curve indicates the low resistance condition which is produced when the base is negative to the catswhisker. When the base is positive to the catswhisker, the portion 15 of the curve is produced. As the positive potential on the base increases, the current increases at first slowly in the positive direction, in accordance with the high backward resistance. There is, however, found with germanium (and also with certain other rectifier materials such as silicon) a certain critical voltage indicated by the dotted line 16, at which the current rapidly increases, while the potential across the crystal decreases, producing a portion 17 of the curve having a negative slope.

Fig. 1 depends for its operation on this negative resistance property of the germanium rectifier. If a negative bias voltage slightly less than the critical voltage 16 be applied to the catswhisker electrode, corresponding for example to the point 18 of the curve (Fig. 2), then a slight increase of this negative voltage is sufficient to tip the rectifier into the negative slope region, and it will settle down to a condition represented by a point such as 19, which will be determined by the value of the resistance 6 in the circuit of Fig. 1. In this condition, a greatly increased current may flow, and the arrangement can therefore be adapted to operate as an amplifier.

In Fig. 1, since the catswhisker electrode 12 is connected to ground, the condition corresponding to the point 18 will be obtained when the positive terminal of the bias source 5 is connected to the base electrode 13 as shown.

If now a short positive pulse be applied to terminal 3, having an amplitude greater than the difference between the voltages corresponding to 16 and 18, the rectifier will be tipped over into the negative slope region and will take up the condition represented by the point 19. If now a negative pulse of sufficient amplitude be applied at terminal 3, the rectifier may be restored again to the condition 18. Accordingly by applying a train of alternately positive and negative input pulses a train of rectangular output pulses of large amplitude may be obtained from the output terminal 8.

It will be seen that the circuit of Fig. 1 has properties very similar to the well known two-condition flip-flop multivibrator circuit consisting of two-cross-connected valves, and is very much simpler.

In a particular case of the circuit of Fig. 1, the condition 18 was produced by the use of a bias voltage of the order of 50 volts, which was some 5 to 10 volts less than the voltage 16. The resistance 6 was about 30,000 ohms and the input pulses were supplied from a low impedance source. The capacity of the input condenser 4 was about 0.1 microfarad. It will be understood that the proper bias voltage to use will depend upon the properties of the rectifier used and will be determined by the critical voltage 16 which may differ in some cases quite considerably from 50 volts.

In Fig. 1, the rectifier 1 may be reversed, if desired, so that the base electrode 13 is connected to ground instead of the catswhisker electrode 12. In that case, the source 5 should also be inverted, and negative input pulses will be required to shift the rectifier from the condition 18 to the condition 19.

Figure 4:
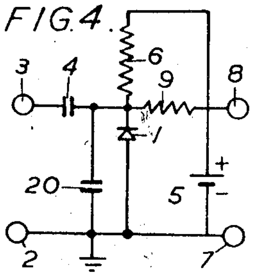
Figs. 4 and 5 show modifications of Fig. 1.

In Fig. 1, the rectifier will be permanently stable in either condition, but if it be shunted by a condenser 20, as shown in Fig. 4 (in which all the other elements have the same designations as in Fig. 1), the circuit may be made self-restoring so that it reverts to the condition 18 after having been switched into the condition 19 by a short input pulse. In that case a short amplified output pulse may be obtained from terminal 8 but it will be of the opposite sign to the input pulse. The action of the condenser 20 depends on the existence of some inductance in the circuit. It has been found that the inductance associated with the lead conductors of the circuit is sufficient for the purpose, so that no actual inductance element need be provided. When the circuit is triggered so that the rectifier is tipped over into the negative slope region, the combination of the capacity of the condenser 20 and the above-mentioned inductance forms an oscillatory circuit which causes the voltage across the condenser to decrease further beyond the voltage corresponding to the point 19 (Fig. 3). The existence of the load resistance 6 (Fig. 4) prevents the current through the rectifier from increasing by the corresponding amount according to the portion 17 of the characteristic curve. The condenser 20 meanwhile holds the voltage across the rectifier at the decreased value, and therefore, the current through the rectifier is obliged to assume the only other value consistent with the characteristic curve, and therefore must collapse down to the much smaller value corresponding to the portion 15 of the curve. The rectifier is thereby forced out of the negative slope region. The condenser now charges up again until the potential across the rectifier corresponds to the point 18, and the circuit is back again in its original condition. The circuit of Fig. 4 is therefore a very simple pulse amplifier. It should be pointed out that the condenser 20 might represent the self capacity of the winding connected to the rectifier, so that an actual condenser might not have to be supplied.

Figure 5:
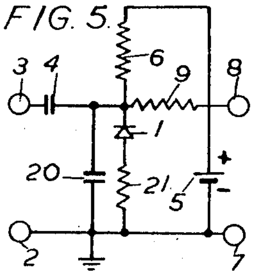

Fig. 5 shows a minor modification of Fig. 4 in which a resistance 21 is included in series with the rectifier 1. This resistance may be useful to control the time during which the rectifier remains in the condition 19.

Fig. 6 shows a practical example of the application of the circuit of Fig. 4 to an electric pulse repeater for use, for example, on a coaxial cable system. The repeater circuit is shown connected between two coaxial cables 22 and 23 the sheaths of which are connected by a grounded conductor 24. The repeater circuit comprises a germanium rectifier 25 shunted by a condenser 26 corresponding respectively to 1 and 20 of Fig. 4. The rectifier is in this case biassed over the cable from a source (not shown), located at some other station, which is used also to bias any other repeaters there may be on the cable. The source will have its positive terminal connected to the inner conductor 27 of the cable. This conductor is connected through a high frequency choke coil 28 and the load resistance 29 (corresponding to the resistance 6 of Fig. 4) to the rectifier 25. A high frequency by-pass condenser 30 connects the junction point of elements 28 and 29 to ground.

The pulses to be amplified, which also arrive on conductor 27, are applied to the rectifier through a pulse transformer 31 having blocking condensers 32 and 33 in series with its windings.

Assuming that the input pulses are positive pulses, the transformer windings should both be wound in the same direction so that positive pulses will be applied to the rectifier 25. As already explained with respect to Fig. 4, the rectifier will be switched by each pulse into the high current condition 19, and will revert back to the condition 18, on account of the presence of the condenser 26. An amplified negative pulse will be produced, as already explained, which is supplied again to the cable conductor 27 through the transformer 31, which thus acts both as an input and as an output transformer. It should be noted however, that the amplified pulse will be negative so that the pulses will be inverted by the repeater. This need not be any objection when there is a chain of repeaters, since the transformers in alternate repeaters may be oppositely poled to accept negative instead of positive pulses.

It will be clear that the output pulse in Fig. 6 will be a combination of the original small positive input pulse with the amplified negative pulse. The unwanted positive portion can, however, be disregarded since it will have no effect on the next repeater.

In an actual example of Fig. 6 the resistance 29 had a value of 15,000 ohms, the condenser 26 had a capacity of 0.0015 microfarad, and the transformer 31 had a step up impedance ratio from the cable to the rectifier of about 16.

Figure 7:
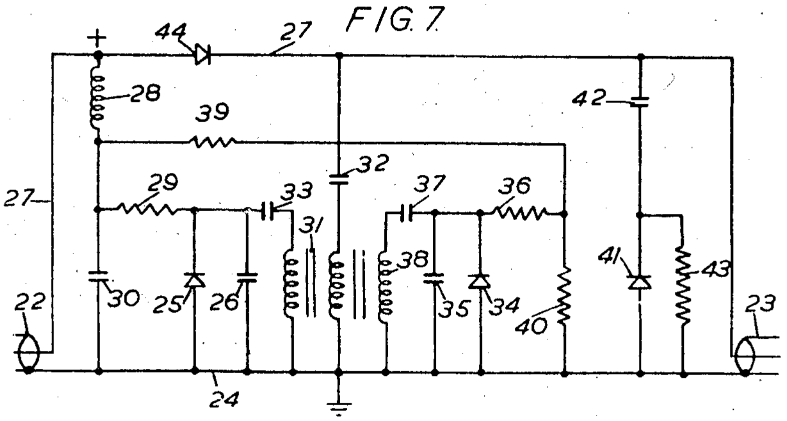

If it is desired to avoid inversion of the pulse in the repeater, the circuit of Fig. 7 may be used. This includes all the elements of Fig. 6, which are given the same designation numbers, together with a second similar trigger circuit having elements 34, 35, 36 and 37 corresponding respectively with elements 25, 26, 29 and 33. The second trigger circuit is coupled to the conductor 27 by means of a third winding 38 on the transformer 31.

The rectifier 34 is biassed with a slightly lower voltage than the rectifier 25 by connecting the load resistance 36 to the junction point of the resistances 39 and 40 which form a potentiometer connecting the choke coil 28 to ground.

When a positive input pulse arrives over the cable 22 it triggers the rectifier 25 as already described, and generates an amplified negative output pulse which is fed through the transformer 31 to the second trigger circuit. The winding 38 should be wound in the opposite direction to the other two windings so that the amplified negative pulse will appear as a positive pulse on the rectifier 34. This will be triggered in the same way as before and will generate a negative pulse which, however, will appear as a positive pulse on the conductor 27 owing to the reversal of the winding 38. Thus it will be clear that in response to the positive input pulse from the cable 22, an amplified negative pulse followed by an amplified positive pulse will be obtained.

It has already been stated that a smaller bias voltage is used on the second trigger circuit. The purpose of this is to prevent this trigger circuit from being directly operated by the negative pulse which will be received from the preceding repeater (not shown) together with the desired positive pulse. By suitable adjustment of the values of the resistances 39 and 40, it can be arranged so that the second trigger circuit will be operated by the amplified negative pulse, but not by the input negative pulse, which will be of much smaller amplitude.

The negative amplified pulse may be cut off if desired by connecting a third rectifier 41 (which need not be a germanium rectifier) in series with a blocking condenser 42 across the cable 23 as shown, the rectifier being directed so that the high resistance condition is produced with a positive potential on the upper electrode. The rectifier 41 should preferably be shunted by a high leak resistance 43. Also the amplified pulses may be prevented from being propagated backwards to the preceding station by inserting a fourth rectifier 44 in the conductor 27 between the cable 22 and the condenser 32, this rectifier being directed to pass positive pulses from the cable 22 to the transformer 31.

While the principles of the invention have been described above in connection with specific embodiments and particular modifications thereof, it is to be clearly understood that this description is made only by way of example and not as a limitation on the scope of the invention.

What is claimed is:

1. An electric trigger circuit comprising a germanium crystal rectifier, means for biassing the point contact electrode negatively with respect to the base electrode through a load resistance, means for applying a signal voltage to the rectifier with such magnitude and sign as effectively to raise the bias voltage above the critical voltage separating the positive and negative resistance condition of the rectifier and an output circuit connected to the rectifier for deriving therefrom an output signal in response to the input signal.

2. A self restoring trigger circuit according to claim 1 comprising a condenser connected in parallel with the rectifier.

3. A trigger circuit according to claim 2 comprising a second resistance connected in series with the rectifier.

4. An electric pulse amplifier comprising a self-restoring trigger circuit according to claim 2, a pair of input terminals connected respectively to the electrodes of the rectifier means for applying a train of input pulses to the input terminals, and means for deriving a train of corresponding amplified output pulses from the rectifier.

5. An electric pulse repeater for connection to a communication circuit comprising a self-restoring trigger circuit according to claim 2, a transformer having a first winding connected across the rectifier and a second winding connected across the communication circuit, and means for biassing the rectifier from a direct current source connected to the communication circuit.

6. A repeater according to claim 5 in which the biassing means comprises a choke coil, connected to one of the conductors of the communication circuit for supplying the bias potential to the rectifier through the load resistance.

7. A repeater according to claim 6 a third winding on the said transformer connected across the rectifier in the second trigger circuit, the first and third windings of the transformer being wound in opposite directions, and means for connecting the choke coil through the load resistance in the second trigger circuit to the corresponding rectifier in such manner as to supply a lower bias potential to the second rectifier than to the first one.

JOHN WEST HARLING.

REFERENCES CITED

The following references are of record in the file of this patent:

UNITED STATES PATENTS

| Number | Name | Date |
|---|---|---|
| 2,218,659 | Saville | Oct. 22, 1940 |
| 2,339,438 | Thompson | Jan. 18, 1944 |
| 2,469,569 | Ohl | May 10, 1949 |
| 2,476,323 | Rack | July 19, 1949 |

OTHER REFERENCES

Magazine: "Electronics," Feb. 1946, pp. 118–123.